(12) United States Patent
Frieding et al.

(10) Patent No.: US 11,057,720 B1
(45) Date of Patent: Jul. 6, 2021

(54) REMOTE MICROPHONE DEVICES FOR AUDITORY PROSTHESES

(71) Applicant: Cochlear Limited, Macquarie University (AU)

(72) Inventors: Jan Patrick Frieding, Grose Vale (AU); Soren Nilsson, Molnlycke (SE); Kenneth Oplinger, St. Leonards (AU); Alexander von Brasch, Cremorne (AU); Roger Smith, St. Ives Chase (AU); Richard Murphy, Kirribilli (AU)

(73) Assignee: Cochlear Limited, Macquarie University (AU)

( * ) Notice: Subject to any disclaimer, the term of this patent is extended or adjusted under 35 U.S.C. 154(b) by 0 days.

(21) Appl. No.: 16/424,673

(22) Filed: May 29, 2019

Related U.S. Application Data

(60) Provisional application No. 62/681,194, filed on Jun. 6, 2018.

(51) Int. Cl.
*H04R 25/00* (2006.01)
*G06F 3/01* (2006.01)
*G06F 3/0482* (2013.01)

(52) U.S. Cl.
CPC ........... *H04R 25/407* (2013.01); *G06F 3/012* (2013.01); *G06F 3/013* (2013.01); *H04R 25/405* (2013.01);
(Continued)

(58) Field of Classification Search
CPC .... H04R 25/40; H04R 25/405; H04R 25/407; H04R 25/50; H04R 25/505; H04R 25/55;
(Continued)

(56) References Cited

U.S. PATENT DOCUMENTS 7,076,072 B2    7/2006    Feng et al.
7,835,799 B1    11/2010    Segel et al.
(Continued)

OTHER PUBLICATIONS

Dictionary of Physics, Frame of Reference (Oxford, 2009) (https://www.oxfordreference.com/view/10.1093/acref/9780199233991.001.0001/acref-9780199233991-e-1177?print) (last accessed Jul. 31, 2020) (Year: 2009).*

(Continued)

*Primary Examiner* — Walter F Briney, III
(74) *Attorney, Agent, or Firm* — Edell, Shapiro & Finnan, LLC

(57) ABSTRACT

Presented herein are techniques for adapting settings/operations of a remote microphone device associated with an auditory prosthesis based on a desired/preferred listening direction of a recipient of the auditory prosthesis. More specifically, an auditory prosthesis worn by a recipient and a remote microphone device, which are configured to wirelessly communicate with one another, are both positioned in the same spatial area. At least one of a recipient-specified (e.g., recipient-preferred) region of interest within the spatial area, or a recipient-specified listening direction, is determined. Based on a determined relative positioning (e.g., location and orientation) of the remote microphone device and the auditory prosthesis, operation of the remote microphone device is dynamically adapted so that the remote microphone device can focus on (e.g., have increased sensitivity to) sounds originating from the recipient-specified region of interest/listening direction.

29 Claims, 8 Drawing Sheets

(52) U.S. Cl.
CPC ......... *H04R 25/505* (2013.01); *H04R 25/554* (2013.01); *H04R 25/558* (2013.01); *G06F 3/0482* (2013.01); *H04R 2225/55* (2013.01); *H04R 2225/61* (2013.01)

(58) Field of Classification Search
CPC ........................ H04R 25/554; H04R 25/558; H04R 2225/41; H04R 2225/55; H04R 2225/61; H04R 2430/20; H04R 2430/21; H04R 2430/23; H04R 2430/25; H04R 2460/07; H04R 3/005; H04R 1/32; H04R 1/326; H04R 1/40; H04R 1/406
See application file for complete search history.

(56) References Cited

U.S. PATENT DOCUMENTS

| | | |
|---|---|---|
| 8,606,571 B1 | 12/2013 | Every et al. |
| 9,197,974 B1 | 11/2015 | Clark et al. |
| 2014/0112496 A1 | 4/2014 | Murgia et al. |
| 2015/0049892 A1* | 2/2015 | Petersen ............ H04R 25/554 381/315 |
| 2019/0028817 A1* | 1/2019 | Gabai ................ G06K 9/00362 |
| 2019/0174237 A1* | 6/2019 | Lunner .................. G06F 1/163 |

OTHER PUBLICATIONS

Dictionary of Physics, Polar Coordinates (Oxford, 2009) (https://www.oxfordreference.com/view/10.1093/acref/9780199233991.001.0001/acref-9780199233991-e-2371?rskey=tTGTuQ&result=1&print) (last accessed Jul. 31, 2020) (Year: 2009).*

Anonymous, Groundbreaking Microphone Technology to be Launched by Phonak and Advanced Bionics, Audiology Online, Continued, Feb. 7, 2018, 4 pages.

* cited by examiner

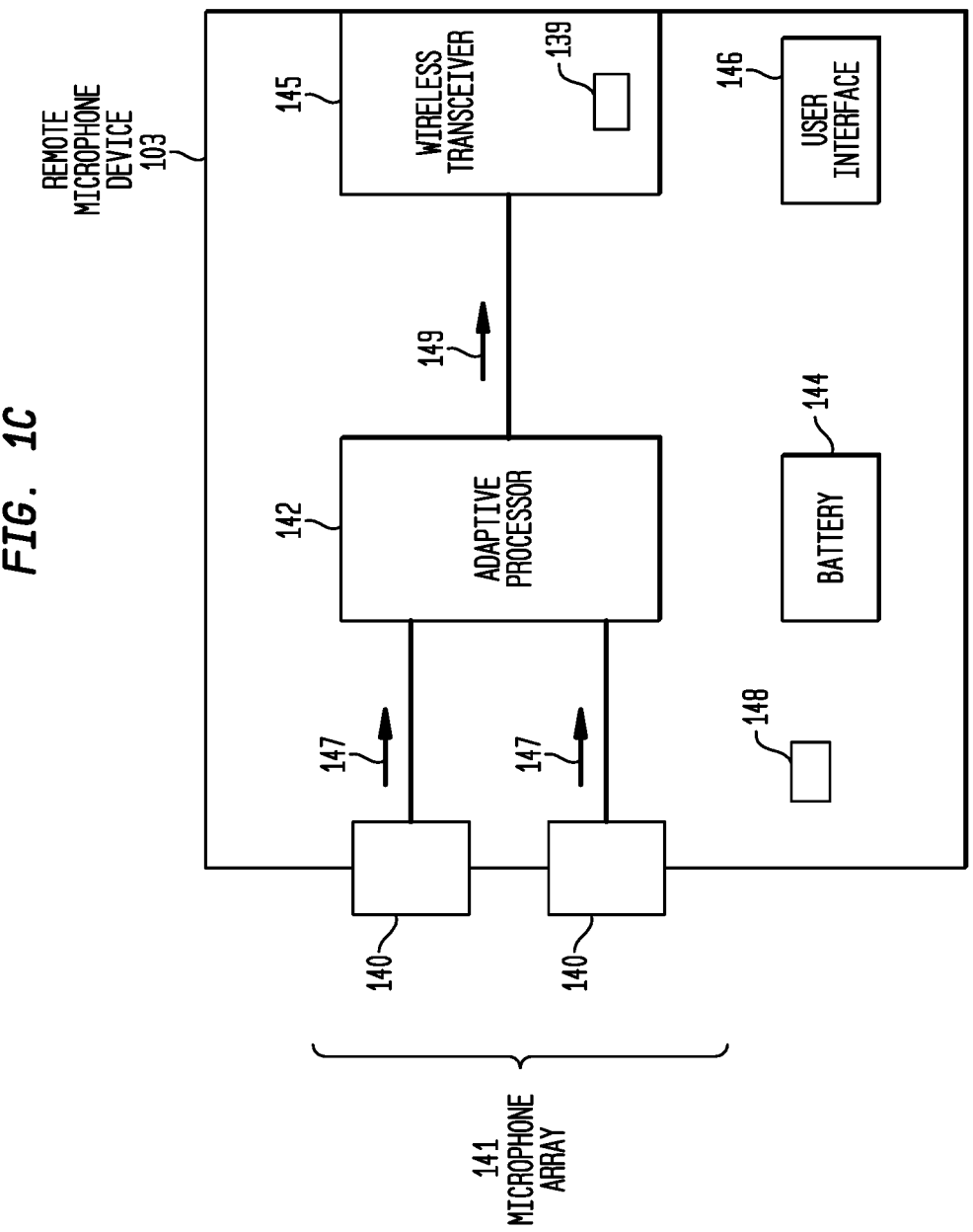

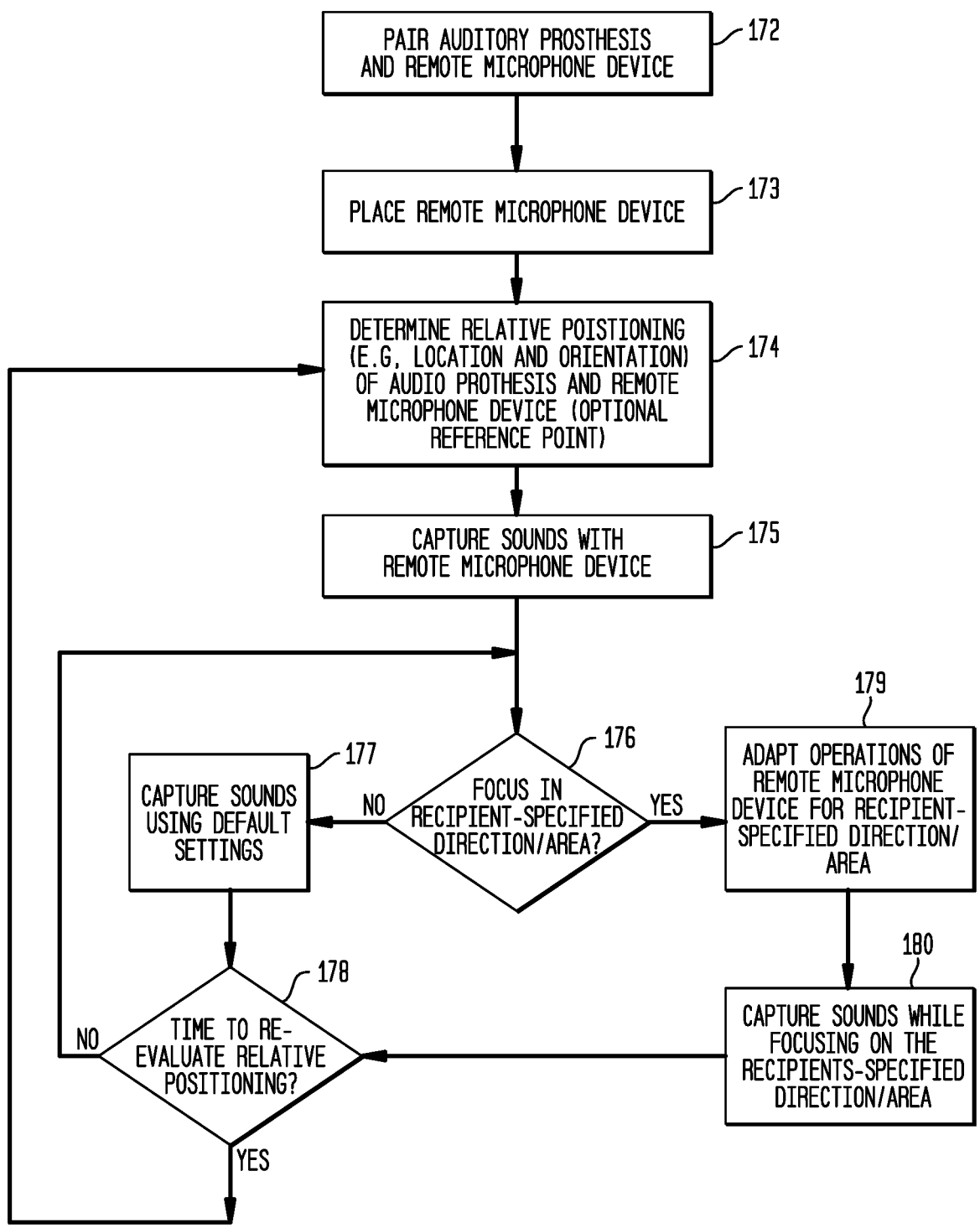

REMOTE MICROPHONE DEVICES FOR AUDITORY PROSTHESES

CROSS-REFERENCE TO RELATED APPLICATION

This application claims the benefit of U.S. Provisional Patent Application No. 62/681,194, filed Jun. 6, 2018, the contents of which is hereby incorporated by reference herein.

BACKGROUND

Field of the Invention

The present invention relates generally to remote microphone devices operable with auditory prostheses.

Related Art

Hearing loss is a type of sensory impairment that is generally of two types, namely conductive and/or sensorineural. Conductive hearing loss occurs when the normal mechanical pathways of the outer and/or middle ear are impeded, for example, by damage to the ossicular chain or ear canal. Sensorineural hearing loss occurs when there is damage to the inner ear, or to the nerve pathways from the inner ear to the brain.

Individuals who suffer from conductive hearing loss typically have some form of residual hearing because the hair cells in the cochlea are undamaged. As such, individuals suffering from conductive hearing loss typically receive an auditory prosthesis that generates motion of the cochlea fluid. Such auditory prostheses include, for example, acoustic hearing aids, bone conduction devices, and direct acoustic stimulators.

In many people who are profoundly deaf, however, the reason for their deafness is sensorineural hearing loss. Those suffering from some forms of sensorineural hearing loss are unable to derive suitable benefit from auditory prostheses that generate mechanical motion of the cochlea fluid. Such individuals can benefit from implantable auditory prostheses that stimulate nerve cells of the recipient's auditory system in other ways (e.g., electrical, optical and the like). Cochlear implants are often proposed when the sensorineural hearing loss is due to the absence or destruction of the cochlea hair cells, which transduce acoustic signals into nerve impulses. An auditory brainstem stimulator is another type of stimulating auditory prosthesis that may be proposed when a recipient experiences sensorineural hearing loss due to damage to the auditory nerve.

SUMMARY

In one aspect, a method is provided. The method comprises: determining a relative location and orientation of a remote microphone device to an auditory prosthesis, wherein the auditory prosthesis and the remote microphone device are each located within a same spatial area and wherein the remote microphone device comprises a plurality of microphones; determining a recipient-specified region of interest within the spatial area; and focusing, by the remote microphone device, the plurality of microphones of the remote microphone device on the recipient-specified region of interest within the spatial area.

In another aspect, a method is provided. The method comprises: synchronizing location and orientation information of a remote microphone device with location and orientation information of an auditory prosthesis worn by a recipient, wherein the auditory prosthesis and the remote microphone device are each located within a same spatial area; determining substantially a real-time recipient-specified listening direction for the remote microphone device; and wirelessly sending directional data to the remote microphone device indicting the substantially real-time recipient-specified listening direction.

In another aspect a remote microphone device is provided. The remote microphone device comprises: a wireless transceiver configured for direct or indirect communication with an auditory prosthesis; a microphone array configured to capture sound signals; and at least one processor configured to process the captured sound signals for wireless transmission by the wireless transceiver to the wireless transceiver of the auditory prosthesis, wherein the at least one processor is configured to dynamically adjust a directionality of the microphone array to one of a recipient-specified area of interest within a spatial area of the remote microphone device or a recipient-specified listening direction for the remote microphone device.

In another aspect an auditory prosthesis system is provided. The auditory prosthesis system comprises: an auditory prosthesis configured to be worn by a recipient and comprising a first microphone array; a remote microphone device comprising a second microphone array and located in a same spatial area as the auditory prosthesis; and one or more processors configured to: synchronize location and orientation information of the remote microphone device with location and orientation information of the auditory prosthesis; determine, based on the synchronized location and orientation information, a recipient-specified region of interest within the spatial area; and focus one or both of the first microphone array or the second microphone array on the recipient-specified region of interest within the spatial area.

BRIEF DESCRIPTION OF THE DRAWINGS

Embodiments of the present invention are described herein in conjunction with the accompanying drawings, in which:

FIG. 1C is a block diagram of the remote microphone device of FIG. 1A;

FIG. 5 is a flowchart of an example method, in accordance with certain embodiments presented herein;

DETAILED DESCRIPTION

Presented herein are techniques for adapting settings/operations of a remote microphone device associated with an auditory prosthesis based on a desired/preferred listening direction of a recipient of the auditory prosthesis. More specifically, an auditory prosthesis worn by (e.g., positioned on, or implanted in) a recipient and a remote microphone device, which are configured to wirelessly communicate with one another, are both positioned in the same spatial area. At least one of a substantially real-time recipient-specified (e.g., recipient-preferred) region of interest within the spatial area, or a substantially real-time recipient-specified listening direction, is determined. Based on a determined relative positioning (e.g., location and orientation) of the remote microphone device and the auditory prosthesis, operation of the remote microphone device is dynamically adapted so that the remote microphone device can focus on (e.g., have increased sensitivity to) sounds originating from the recipient-specified region of interest/listening direction.

Merely for ease of description, the techniques presented herein are primarily described herein with reference to one illustrative auditory/hearing prosthesis, namely a cochlear implant. However, it is to be appreciated that the techniques presented herein may also be used with a variety of other non-implantable, partially-implantable, or fully-implantable auditory prostheses, including acoustic hearing aids, bone conduction devices, middle ear auditory prostheses (middle ear implants), direct acoustic stimulators, auditory brain stimulators, devices for a person with normal hearing, etc.

Figure 1A:
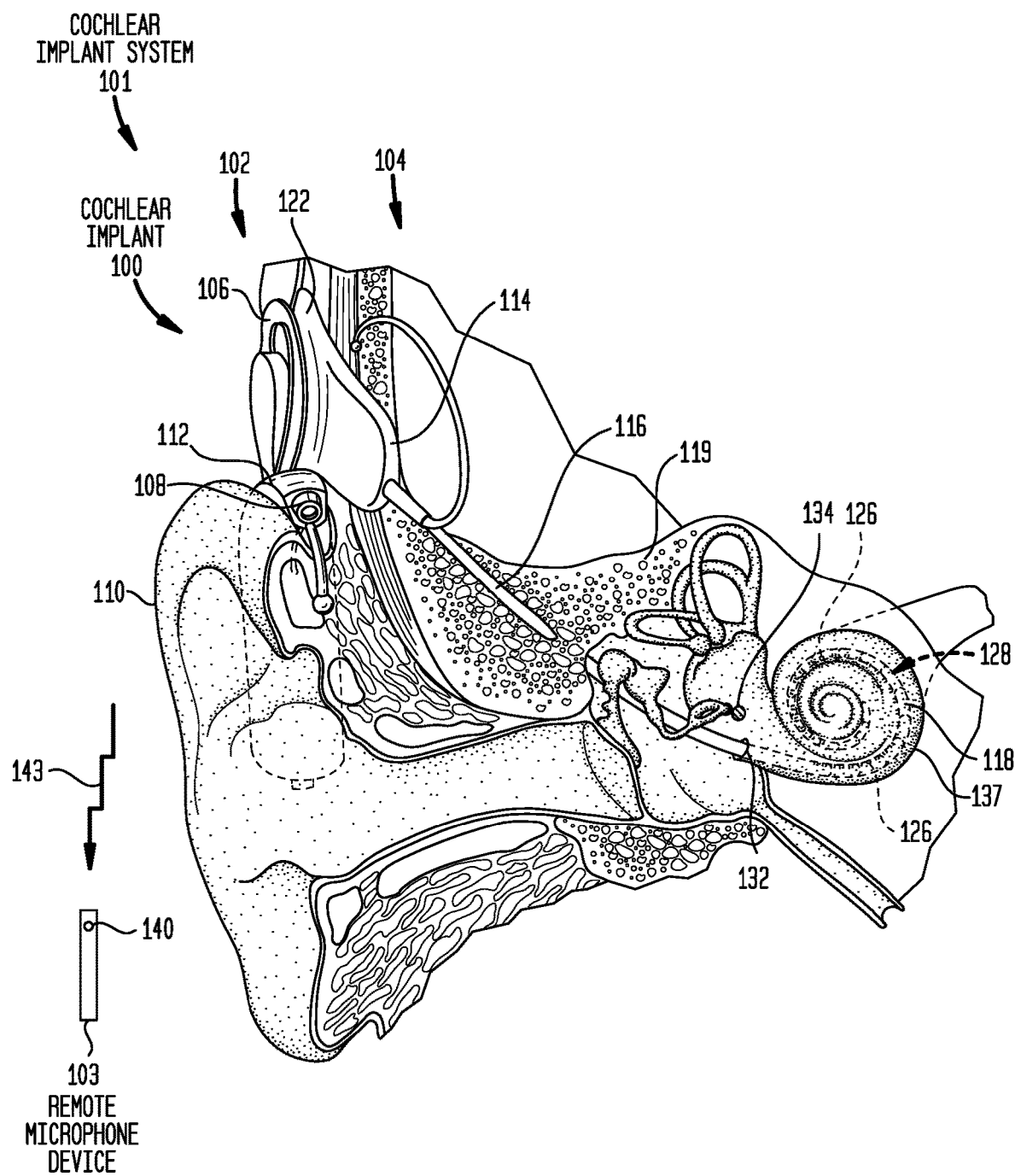
FIG. 1A is a schematic diagram illustrating a cochlear implant system comprising a cochlear implant and remote microphone device, in accordance with certain embodiments presented herein.
Figure 1B:
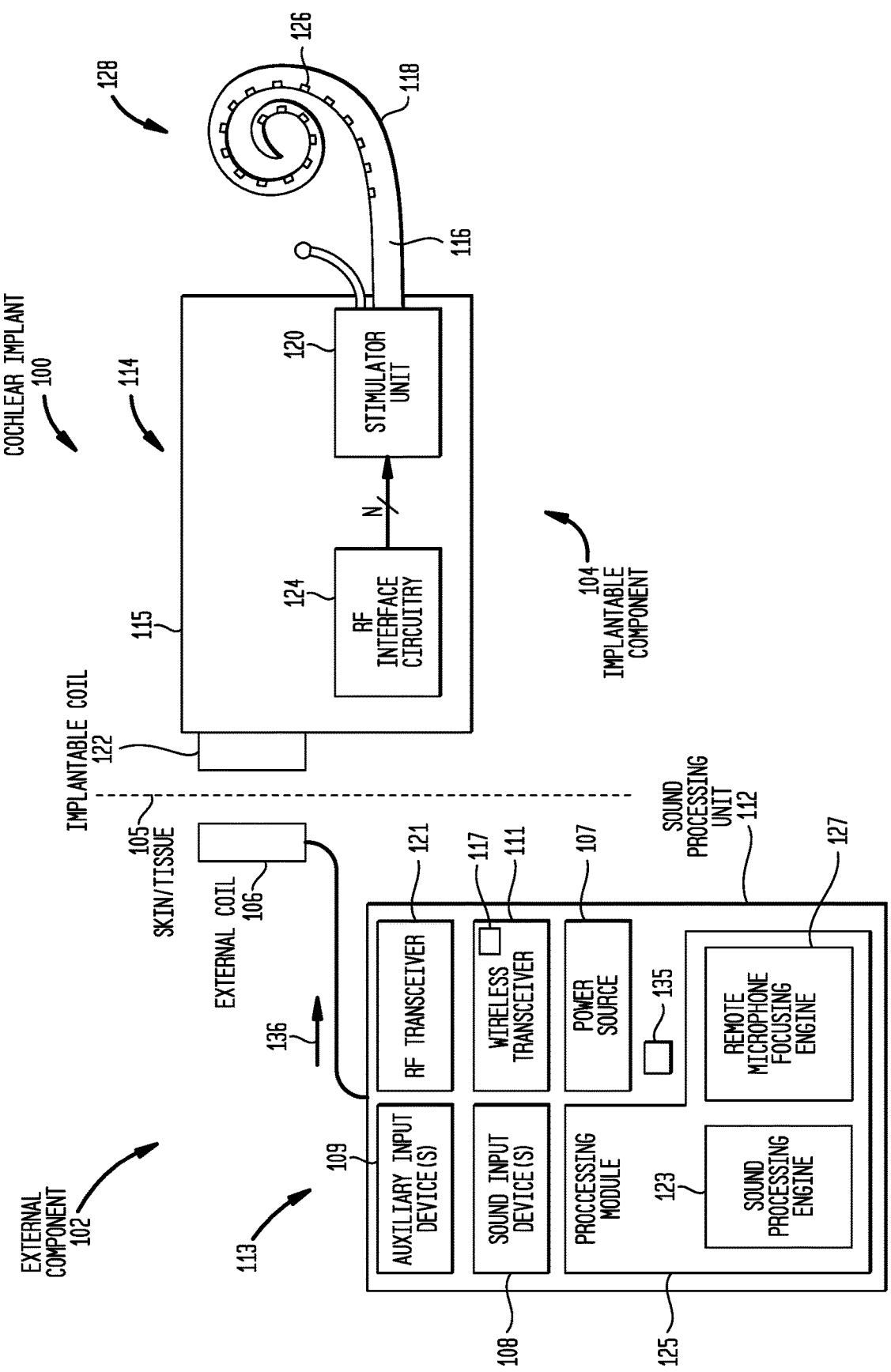
FIG. 1B is a block diagram of the cochlear implant of FIG. 1A.

Shown in FIGS. 1A, 1B, and 1C is an exemplary cochlear implant system 101 configured to execute the techniques presented herein. More particularly, FIG. 1A is a schematic diagram illustrating that the exemplary cochlear implant system 101 comprises a cochlear implant 100 and a remote microphone device 103. FIG. 1B is a block diagram illustrating one example arrangement of the cochlear implant 100, while FIG. 1C is a block diagram illustrating one example arrangement of the remote microphone device 103. For ease of illustration, FIGS. 1A and 1B will be described together, followed by a description of FIG. 1C. In certain embodiments, the cochlear implant system 101 may also comprise a mobile computing device which, for ease of illustration has been omitted from FIGS. 1A-1C.

Referring first to FIGS. 1A and 1B, the cochlear implant 100 comprises an external component 102 and an internal/implantable component 104. The external component 102 is configured to be worn by the recipient (e.g., directly or indirectly attached to the body of the recipient) and typically comprises an external coil 106 and, generally, a magnet (not shown in FIG. 1) fixed relative to the external coil 106. The external component 102 also comprises one or more input elements/devices 113 for receiving input signals at a sound processing unit 112. In this example, the one or more input devices 113 include sound input devices 108 (e.g., microphones positioned by auricle 110 of the recipient, telecoils, etc.) configured to capture/receive input signals, one or more auxiliary input devices 109 (e.g., audio ports, such as a Direct Audio Input (DAI), data ports, such as a Universal Serial Bus (USB) port, cable port, etc.), and a wireless transmitter/receiver (transceiver) 111, each located in, on, or near the sound processing unit 112.

The wireless transceiver 111 may have a number of different arrangements. In one example, the wireless transceiver 111 includes an integrated antenna 117 and may be configured to operate in accordance with the Bluetooth® or other short-range wireless technology standard that enables the sound processing unit 112 to wirelessly communicate with another device (i.e., receive and transmit data to/from another device via a wireless connection using, for example, 2.4 Gigahertz (GHz) Ultra high frequency (UHF) radio waves, 5 GHz Super high frequency (SHF) radio waves, etc.). Bluetooth® is a trademark of Bluetooth Special Interest Group (SIG), Inc. It is to be appreciated that reference to the Bluetooth® standard is merely illustrative and that the wireless transceiver 111 may make use of any other wireless standard now known or later developed.

Sound processing unit 112 may also comprises one or more orientation/directional sensors 135 (e.g., one or more of an accelerometer, a gyroscope, a magnetometer, a compass, etc.). In addition, the sound processing unit 112 includes, for example, at least one power source (e.g., battery) 107, a radio-frequency (RF) transceiver 121, and a processing module 125 that includes a sound processing engine 123 and a remote microphone focusing engine 127. The processing module 125, and thus the sound processing engine 123 and the remote microphone focusing engine 127, may be formed by any of, or a combination of, one or more processors (e.g., one or more Digital Signal Processors (DSPs), one or more uC cores, etc.), firmware, software, etc. arranged to perform operations described herein. That is, the processing module 125 may be implemented as firmware elements, partially or fully implemented with digital logic gates in one or more application-specific integrated circuits (ASICs), partially or fully in software, etc.

In the examples of FIGS. 1A and 1B, the external component 102 comprises a behind-the-ear (BTE) sound processing unit 112 configured to be attached to, and worn adjacent to, the recipient's ear and a separate coil 106. However, it is to be appreciated that embodiments of the present invention may be implemented with systems that include other arrangements, such as systems comprising an off-the-ear (OTE) sound processing unit (i.e., a component having a generally cylindrical shape and which is configured to be magnetically coupled to the recipient's head and which includes an integrated coil), a mini or micro-BTE unit, an in-the-canal unit that is configured to be located in the recipient's ear canal, a body-worn sound processing unit, etc.

Returning to the example embodiment of FIGS. 1A and 1B, the implantable component 104 comprises an implant body (main module) 114, a lead region 116, and an intra-cochlear stimulating assembly 118, all configured to be implanted under the skin/tissue (tissue) 105 of the recipient. The implant body 114 generally comprises a hermetically-sealed housing 115 in which RF interface circuitry 124 and a stimulator unit 120 are disposed. The implant body 114 also includes an internal/implantable coil 122 that is generally external to the housing 115, but which is connected to the RF interface circuitry 124 via a hermetic feedthrough (not shown in FIG. 1B).

Stimulating assembly 118 is configured to be at least partially implanted in the recipient's cochlea 137. Stimulating assembly 118 includes a plurality of longitudinally spaced intra-cochlear electrical stimulating contacts (electrodes) 126 that collectively form a contact or electrode array 128 for delivery of electrical stimulation (current) to the recipient's cochlea. Stimulating assembly 118 extends through an opening in the recipient's cochlea (e.g., cochleostomy, the round window, etc.) and has a proximal end connected to stimulator unit 120 via lead region 116 and a hermetic feedthrough (not shown in FIG. 1B). Lead region 116 includes a plurality of conductors (wires) that electrically couple the electrodes 126 to the stimulator unit 120.

As noted, the cochlear implant 100 includes the external coil 106 and the implantable coil 122. The coils 106 and 122 are typically wire antenna coils each comprised of multiple turns of electrically insulated single-strand or multi-strand platinum or gold wire. Generally, a magnet is fixed relative to each of the external coil 106 and the implantable coil 122. The magnets fixed relative to the external coil 106 and the implantable coil 122 facilitate the operational alignment of the external coil with the implantable coil. This operational alignment of the coils 106 and 122 enables the external component 102 to transmit data, as well as possibly power, to the implantable component 104 via a closely-coupled wireless link formed between the external coil 106 with the implantable coil 122. In certain examples, the closely-coupled wireless link is a radio frequency (RF) link. However, various other types of energy transfer, such as infrared (IR), electromagnetic, capacitive and inductive transfer, may be used to transfer the power and/or data from an external component to an implantable component and, as such, FIG. 1B illustrates only one example arrangement.

The processing module 125 of sound processing unit 112 is configured to perform a number of operations. In particular, the processing module 125 is configured to convert sound/audio signals into stimulation control signals 136 for use in stimulating a first ear of a recipient (i.e., the sound processing engine 123 is configured to perform sound processing on input audio signals received at the sound processing unit 112). The sound signals that are processed and converted into stimulation control signals may be sound signals received via the sound input devices 108, signals received via the auxiliary input devices 109, and/or signals received via the wireless transceiver 111.

In the embodiment of FIG. 1B, the stimulation control signals 136 are provided to the RF transceiver 121, which transcutaneously transfers the stimulation control signals 136 (e.g., in an encoded manner) to the implantable component 104 via external coil 106 and implantable coil 122. That is, the stimulation control signals 136 are received at the RF interface circuitry 124 via implantable coil 122 and provided to the stimulator unit 120. The stimulator unit 120 is configured to utilize the stimulation control signals 136 to generate electrical stimulation signals (e.g., current signals) for delivery to the recipient's cochlea via one or more stimulating contacts 126. In this way, cochlear implant 100 electrically stimulates the recipient's auditory nerve cells, bypassing absent or defective hair cells that normally transduce acoustic vibrations into neural activity, in a manner that causes the recipient to perceive one or more components of the input audio signals.

As noted, FIGS. 1A, and 1B illustrate one example arrangement for the cochlear implant 100. However, it is to be appreciated that embodiments of the present invention may be implemented in cochlear implants or hearing prostheses having alternative arrangements. For example, it is to be appreciated that the use of an external component is merely illustrative and that the techniques presented herein may be used in arrangements having an implanted sound processor (e.g., totally implantable cochlear implants, etc.). It is also to be appreciated that the individual components referenced herein, e.g., sound input element 108 and the sound processor in sound processing unit 112, may be distributed across more than one prosthesis, e.g., two cochlear implants, and indeed across more than one type of device, e.g., cochlear implant 100 and a consumer electronic device or a remote control of the cochlear implant 100.

Increasingly popular with recipients/users of auditory prostheses (e.g., hearing aids, cochlear implants, etc.) are remote/wireless microphone devices/accessories. Remote microphone devices are stand-alone portable electronic components (e.g., physically separate from an auditory prosthesis) that include one or more microphones, and possibly other sound input devices, configured to capture/receive sound signals. The captured sound signals are then digitally encoded and wirelessly transmitted to the auditory prostheses.

There are many applications for these remote microphone devices. One application is where an auditory prosthesis recipient leaves the remote microphone device on the lectern during a lecture. Due to the much closer proximity of the remote microphone device to the lecturer, the microphone(s) on the remote microphone device then capture the audio from the lecturer far better than the auditory prosthesis itself would when worn by the recipient sitting in the audience. The audio that the remote microphone device picks up from the lecturer at the lectern is streamed wirelessly to the auditory prosthesis.

Remote microphone devices work well in the above application and others in which the remote microphone device is held in a fixed position, such as when the device is worn on a speaker (e.g., the speaker's shirt pocket or collar), and the fixed directionality of the microphones is toward the sound source (e.g., speaker's mouth/head). However, there are several applications of remote microphone devices where the assumption that the fixed directionality of the microphones is toward the sound source may not necessarily be satisfied. For example, consider a situation in which the remote microphone device is placed on a table during a conference or meeting, in order to ensure that the remote microphone device is in reasonable proximity to all potential speakers, and any telephone systems, involved in the conference. However, in such situations, conventional remote microphone device may capture sounds from all areas around the table the same, only capture sounds from fixed areas, or utilize a signal-to-noise ratio-based (SNR-based) approach to capture only the loudest sounds. In each of these examples, the remote microphone device fails to take into account what specific sounds, or sound sources, the recipient actually prefers/desires to hear (e.g., conventional devices do not take the recipient's specific preferences into account, may have a general disadvantage from not being placed in the best possible location, and/or are reliant on SNR to capture sounds).

For example, again consider the situation where the remote microphone device is placed on a table during a conference call. The microphones of the remote microphone device may be directed towards the telephone (either via physical positioning of the remote microphone device or due to the fact that the telephone is the loudest sound source in the room). However, the recipient may need to engage in a side conversation with another person sitting at the table. In this situation, the recipient would prefer to focus on sounds from the other person engaged in the side conversation, rather than sounds emanating from the telephone. However, this is not possible with conventional remote microphone devices that have fixed directionality or which use an SNR-based to capture the loudest sounds. Presented herein are techniques that address these problems with conventional devices by enabling a remote microphone device to dynamically focus on (e.g., have increased sensitivity to) sounds originating from a real-time (i.e., dynamically determined with or without some hysteresis, including attack/release times) recipient-specified region of interest or real-time recipient-specified listening direction. The techniques presented herein may, for example, improve the usage of remote microphone devices in situations such as meetings, conference rooms, classrooms, and lectures since the remote microphone devices will be able to optimally steer the microphone beam in the recipient's desired direction of listening, and do so dynamically.

More particularly, returning to the example of FIGS. 1A-1C, cochlear implant system 101 includes a remote microphone device 103 that is configured to address the problems with conventional remote microphone devices. As shown in FIG. 1C, remote microphone device 103 comprises a plurality of microphones 140 forming a microphone array 141. The remote microphone device 103 also comprises at least one adaptive processor 142, a battery 144, a wireless transceiver 145, a user interface 146, and one or more orientation/directional sensors 148 (e.g., one or more of an accelerometer, a gyroscope, a magnetometer, a compass, etc.).

In operation, sounds are captured/received by the microphones 140 and converted to electrical signals 147. Although not shown in FIG. 1C, the remote microphone device 103 could also comprise other sound input devices in addition to the microphones 140, such as a telecoil, audio input port, etc. The electrical signals 147 output by the microphones 140 (or other sound input devices) are provided to the adaptive processor 142. The adaptive processor 142 may be configured to perform one or more processing operations on the electrical sounds 147, such as, for example, filtering, equalization etc.

As described further below, the adaptive processor 142 is also configured to dynamically adapt operations performed on the electrical signals 147 based on a determined recipient-specified region of interest or recipient-specified listening direction. For example, the adaptive processor 142 is configured to change the one or more processing operations performed on the electrical signals 147 so as to focus the microphone array 141 (i.e., change the directionality/sensitivity of the microphone array 141) to a recipient-specified region of interest/listening direction. That is, the adaptive processor 142 is configured to dynamically process the sound signals (e.g., the electrical signals 147) in a manner such that sounds present in and/or emanating from a limited/constrained region of the physical environment surrounding the remote microphone device 103 are emphasized relative to sounds present in and/or emanating from other areas of the of the physical environment surrounding the remote microphone device 103.

As described further below, the constrained region from which sounds are captured is "recipient-specified," meaning that the region is selected based on one or more recipient provided indicia. The directionality/sensitivity of the microphone array 141 (i.e., the focus of the remote microphone device 103) to the recipient-specified region of interest/listening directional may be achieved through beamforming operations (e.g., the adaptive processor 142 may comprise one or more microprocessors capable of beam-forming to enhance the received audio in direction desired by the recipient).

As a result of the above operations, the adaptive processor 142 generates processed electrical signals 149 which emphasize the sounds captured from the recipient-specified region of interest/listening direction. The processed electrical signals 149 are provided to the wireless transceiver 145 which is then configured to wirelessly send the processed electrical signals 149 to the sound processing unit 112 (i.e., via the wireless transceiver 111).

Similar to the wireless transceiver 111, the wireless transceiver 145 may also have a number of different arrangements. In one example, the wireless transceiver 145 includes an integrated antenna 139 and may be configured to operate in accordance with the Bluetooth® or other short-range wireless technology standard that enables the remote microphone device 103 to wirelessly communicate with sound processing unit 112 to another device (i.e., receive and/or transmit data to/from another device via a wireless connection using, for example, 2.4 Gigahertz (GHz) Ultra high frequency (UHF) radio waves, 5 GHz Super high frequency (SHF) radio waves, etc.). Bluetooth® is a trademark of Bluetooth Special Interest Group (SIG), Inc. It is to be appreciated that reference to the Bluetooth® standard is merely illustrative and that the wireless transceiver 145 may make use of any other wireless standard now known or later developed.

The adaptive processor 142 may be formed by any of, or a combination of, one or more Digital Signal Processors (DSPs), one or more uC cores, etc., firmware, software, etc. arranged to perform operations described herein. That is, the adaptive processor 142 may be implemented as firmware elements, partially or fully implemented with digital logic gates in one or more ASICs, partially or fully in software, etc. The user interface 146 may take many different forms and may include, for example, one or more buttons, touch-wheel, touchscreen, etc. In one example, the user interface 146 includes one or more light emitting diodes (LEDs) or other devices that provide a visual indication of the direction in which the microphone array 141 is focused.

It is to be appreciated that FIG. 1C illustrates one example arrangement for a remote microphone device. However, it is also to be appreciated that remote microphone devices configured to execute techniques for described herein may have a number of other arrangements.

In certain examples, another device in the system directs the remote microphone device 103 (i.e., the adaptive processor 142) as to the direction/area on which to focus. For instance, the sound processing unit 112 or a mobile device (e.g., application executed on a mobile device) could determine that direction, and communicate it to the remote microphone. Merely for ease of illustration, FIGS. 1A-1C illustrate examples in which the operations of the remote microphone device 103 (i.e., of the adaptive processor 142) to focus the microphone array 141 on the recipient-specified region of interest/listening direction are enabled based on data received from the sound processing unit 112 (e.g., from processing module 125). However, as noted, it is to be appreciated that these specific examples of FIGS. 1A-1C are merely illustrative.

More specifically, as noted above, the processing module 125 of the sound processing unit 112 includes the remote microphone focusing engine 127. The remote microphone focusing engine 127 is configured to determine a relative position (e.g., location and orientation) of the remote microphone device 103 to the cochlear implant 100 (e.g., the sound processing unit 112). In addition, the remote microphone focusing engine 127 is configured to determine the recipient-specified region of interest/listening direction based on one or more recipient provided indicia. As described further below, in certain embodiments the recipient provided indicia is a primary gaze (i.e., look) direction of the cochlear implant recipient.

Also as described further below, the remote microphone focusing engine 127 is configured to cause the sound processing unit 112, more specifically the wireless transceiver 111, to send "recipient-specified directional data" to the remote microphone device 103, more specifically the transceiver 145. The remote microphone device 103 (adaptive processor 142) is configured to use the recipient-specified directional data to focus the microphone array 141 on the recipient-specified region of interest/listening direction. The transfer of the recipient-specified directional data from the sound processing unit 112 to the remote microphone device 103 is generally represented in FIG. 1A by arrow 143.

Although FIG. 1B illustrates the remote microphone focusing engine 127 implemented at the sound processing unit 112, it is to be appreciated that this is one example arrangement. In alternative embodiments, the remote microphone focusing engine 127 may be implemented at a mobile computing device in communication with the sound processing unit 112 and the remote microphone device 103 (e.g., as an application executed at the mobile computing device). Alternatively, the remote microphone focusing engine 127 may be implemented at the remote microphone device 103. Additionally, it is to be appreciated that the remote microphone focusing engine 127 could be implemented across a combination of devices, including two or more of the sound processing unit 112, the remote microphone device 103, a mobile computing device, or other devices operable with the sound processing unit 112 and the remote microphone device 103.

Figure 2:
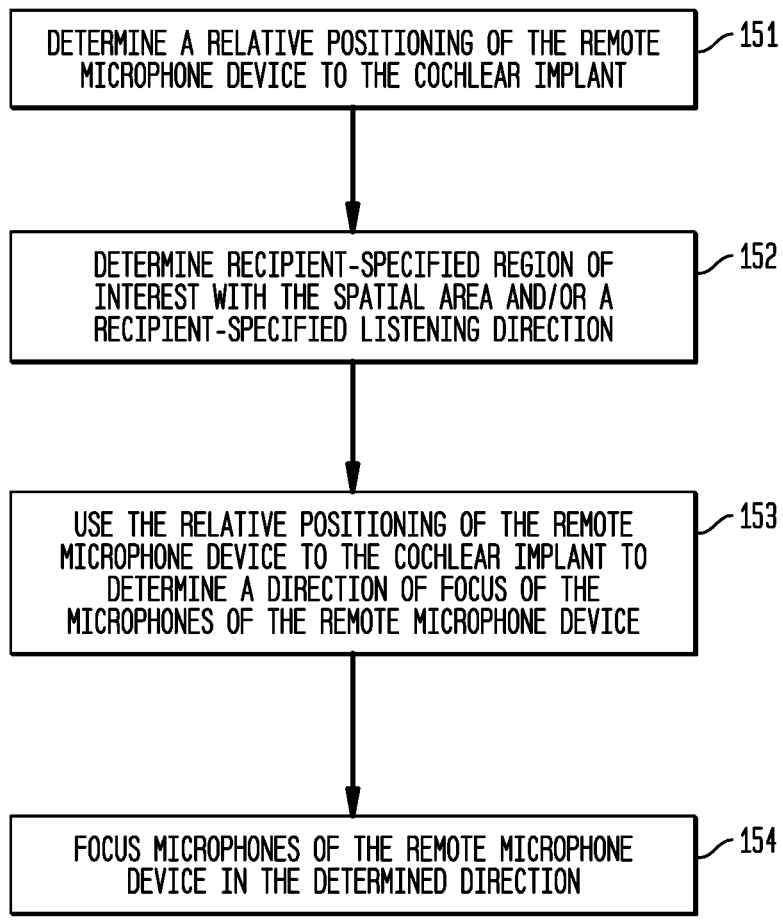
FIG. 2 is high-level flowchart of a method, in accordance with certain embodiments presented herein.

FIG. 2 is a high-level flowchart of a method 150 in accordance with certain embodiments presented herein. For ease of description, method 150 will be described with reference to cochlear implant system 101 of FIGS. 1A-1C. In the embodiment of FIG. 2, the remote microphone device 103 and the cochlear implant 100 are located within the same spatial area. In addition, the cochlear implant 100 is worn by the recipient. As used herein, the "same" spatial area refers to co-location of the remote microphone device 103 and the cochlear implant 100, and thus the recipient, within the same physical proximity. When the microphone device 103 and the cochlear implant 103 are within the same spatial area, they are wireless connected with one another via a wireless communications link, such as a short-range wireless connection (e.g., a Bluetooth® link). Bluetooth® is a trademark of Bluetooth Special Interest Group (SIG), Inc.

Method 150 begins at 151 where a relative positioning (e.g., location and orientation) of the remote microphone device 103 to the cochlear implant 100 within the spatial area is determined. At 152, a recipient-specified region of interest with the spatial area and/or a recipient-specified listening direction is determined. At 153, using the relative positioning of the remote microphone device to the cochlear implant 100, the direction of focus for the remote microphone device 103 (i.e., how to focus the microphone array 141) is determined. At 154, the plurality of microphones 140 of the remote microphone device 103 (i.e., the microphone array 141) are focused in the determined direction (i.e., on the recipient-specified region of interest recipient-specified listening direction). In other words, in the example of FIG. 2, the plurality of microphones 140 of the remote microphone device 103 are turned towards (e.g., have a directionality/sensitivity in a direction of) the recipient's preferred listening direction (i.e., the recipient-specified region of interest).

In FIG. 2, the operations at 154 are generally performed at the remote microphone device 103. However, the operations at 151, 152, and 153 of FIG. 2 may be performed at the cochlear implant 100, the remote microphone device 103, a third device (e.g., mobile phone), or any combination thereof. Further details regarding example operations performed at each of 151, 152, 153, and 154 are provided further.

Referring first to the operations at 152, a "relative position" of the remote microphone device 103 to the cochlear implant 100, or "relative positioning" of the remote microphone device 103 to the cochlear implant 100, may include several different elements/determinations, namely relative locations and orientations, and may be determined in a number of different manners, several which are described below. Since, as noted above, the sound processing unit 112 is an element of the cochlear implant 100 (and thus is worn by the recipient), determining the relative positioning of the remote microphone device 103 to the sound processing unit 112 is to be understood to be the same as determining the relative positioning of the remote microphone device 103 to the cochlear implant 100.

In certain embodiments the remote microphone device 103 and the cochlear implant 100 are able to determine their relative locations (e.g., distance between the devices) and relative orientations (e.g., relative rotational angles) themselves. For instance, in certain embodiments, the relative positioning (e.g., location and orientation) of the remote microphone device 103 to the cochlear implant 100 may be based on one or more compass readings, such as a compass reading from each of the sound processing unit 112 and the remote microphone device 103 (e.g., direction of focus relative to magnetic north or to a reference point in the room). In such embodiments that make use of compass readings, the remote microphone device 103 can focus in the same direction with a relatively wide angle.

In further embodiments, the relative positioning may include determination of the locations of each of the remote microphone device 103 and cochlear implant 100 and/or determination of a distance between the remote microphone device 103 and the cochlear implant 100. As noted, the relative positioning may also include determination of differences in the orientations between the remote microphone device 103 and the cochlear implant 100 in one, two, or three dimensions/planes (e.g., in the X, Y, and/or Z planes). It is to be appreciated that the locations and orientations are "relative" in that they are not necessarily determined in terms of, for example, stationary coordinates. Instead, as described further below, it is the relative separation between the devices, and the angles at which the remote microphone device 103 and the sound processing unit 112 (and thus the microphones thereof) are orientated, which may be used to dynamically adapt the operations of the remote microphone device 103. However, as described further below, in certain examples the relative locations and orientations of the remote microphone device 103 and the sound processing unit 112 may be determined with reference to a stationary reference point.

In accordance with certain embodiments, the relative positioning of the remote microphone device 103 and the cochlear implant 100 is a real-time awareness of the relative locations/orientations of the two devices, which could change dynamically and/or regularly. As such, the relative positioning of the remote microphone device 103 and the cochlear implant 100 may be re-evaluated continually, periodically, etc. and, as described below, may be determined and maintained through a reference point in the spatial area). As used herein, "real-time" should be interpreted to include operations with or without some hysteresis, including certain attack times, release times, etc.

In certain embodiments, the relative locations of the remote microphone device 103 and the cochlear implant 100 could be determined, for example: using a satellite positioning system (e.g., the United States NAVSTAR Global Positioning System (GPS)) in which satellites provide geolocation and time information to receivers in each of the devices; using wireless triangulation systems, sometimes referred to indoor positioning systems (e.g., Wi-Fi® or Bluetooth® based systems), which operate by measuring the intensity/strength of signals received from wireless access points, etc. Wi-Fi® is a registered trademark of the Wi-Fi Alliance and Bluetooth® is a trademark of Bluetooth Special Interest Group (SIG), Inc.

In another example arrangement, one or more ranging pulses (e.g., ultrasonic pulses, radio-frequency pulses, etc.) may be transmitted between the remote microphone device 103 and the sound processing unit 112 to determine the relative location information (e.g., use pulses for distance/range determination between the remote microphone device 103 and the sound processing unit 112 worn by the recipient). Ultrasonic pulses, in particular, may take advantage of the plurality of microphones present in many auditory prostheses and wireless devices.

In certain such examples, a sequence of ranging pulses are emitted from the remote microphone device 103. Range finding and direction detection techniques are then executed at the sound processing unit 112 to determine the relative locations of the remote microphone device 103 and the sound processing unit 112 (and thus the recipient wearing the unit). That is, certain embodiments may use ranging pulse emission from the remote microphone device 103 for analysis at the sound processing unit 112. However, other embodiments may alternatively utilize ranging pulse emission from the sound processing unit 112 for analysis at the remote microphone device 103, an application executed at a third device (e.g., mobile computing device), etc.

In certain arrangements, a single ranging pulse is transmitted relative to a time reference and may be sufficient to determine the relative location information. In other embodiments, a sequence of closely spaced pulses could be transmitted and correlated with a known sequence of pulses. This correlation between the received sequence and the known sequence could be used to determine the distance between the two devices, as well as the relative direction from the remote microphone 103 to the sound processing unit 112 (e.g., the angles at which the remote microphone device 103 and the sound processing unit 112 are orientated). Additionally, certain embodiments may make use of the amplitude of the pulse(s), as received, to estimate direction. In certain embodiments, a ranging pulse is transmitted from one device (e.g., the sound processing unit 112) to evoke a ranging pulse transmission back from the other device (e.g., the remote microphone device 103), thereby enabling the relative location information to be determined.

In another example, a comparison of the sound environment at the sound processing unit 112 relative to the sound environment at the remote microphone device 103 could be used to determine the relative location information. For example, as noted, each of the sound processing unit 112 and the remote microphone device 103 are configured to capture sound signals. These sound signals may be analysed for environmental differences, which can be used to infer the relative locations of the sound processing unit 112 and the remote microphone device 103 within the spatial region. Certain embodiments may make use of a reference point for triangulation (either from acoustic mapping of the space or another accessory).

As noted above, the sound processing unit 112 and the remote microphone device 103 may comprise orientation sensors 135 and 148, respectively. In certain embodiments, data generated by these sensors 135 and/or 148 (e.g., relative movement of the devices from accelerometer data) may be analyzed and used to determine the relative locations of the remote microphone device 103 and the sound processing unit 112. This analysis could be performed at the sound processing unit 112 or another device, such as a mobile computing device (not shown in FIGS. 1A-1C) in wireless communication with each of the sound processing unit 112 and the remote microphone device 103.

In still other embodiments, one or more image capture devices (cameras), such as cameras in a mobile computing device in communication with each of the sound processing unit 112 and the remote microphone device 103, can be used to determine the relative location information. For example, stereo cameras could be used to capture image data which, when analyzed, could determine the distance between the sound processing unit 112 and the remote microphone device 103. Additionally, a sequence of images could capture relative movement of the sound processing unit 112 and the remote microphone device 103. Such a sequence of images could be analyzed using motion detection techniques to determine the relative distance and direction information between the sound processing unit 112 and the remote microphone device 103.

Referring next to determination of the relative orientation of the remote microphone device 103 to the sound processing unit 112, in certain examples the relative orientation information can be determined along with the location information, as described above (e.g., using ranging pulses, sensor data, image date, etc.). For example, in certain arrangements, the orientation information may be determined through accelerometer, gyroscope, compass magnetic sensors, etc. in each of the remote microphone device 103 and the cochlear implant 100 (e.g., sound processing unit 112). In certain embodiments, an accelerometer or other sensor could also be used to determine relative distance between the sound processing unit 112 and the remote microphone device 103. For example, referring specifically to an accelerometer, if the remote microphone device 102 was placed at a certain position, the accelerometer could then be used to track the motion of the person as they move away from that position. By summing together X, Y, Z motional changes, the relative distance information can be determined.

In certain examples, the relative positioning information (e.g., relative location and orientation information) characterizes the differences in locations and orientations between the remote microphone device 103 and the cochlear implant 100 (e.g., sound processing unit 112). However, in certain embodiments, a stationary reference point may also be set within the spatial area and the relative location and orientations between the remote microphone device 103 and this stationary reference point, as well the relative location and orientations between the sound processing unit 112 and this stationary reference point, can be determined. A stationary reference may be used in embodiments in which the recipient and/or the sound source (e.g., a speaker) move about the spatial area.

Figure 3:
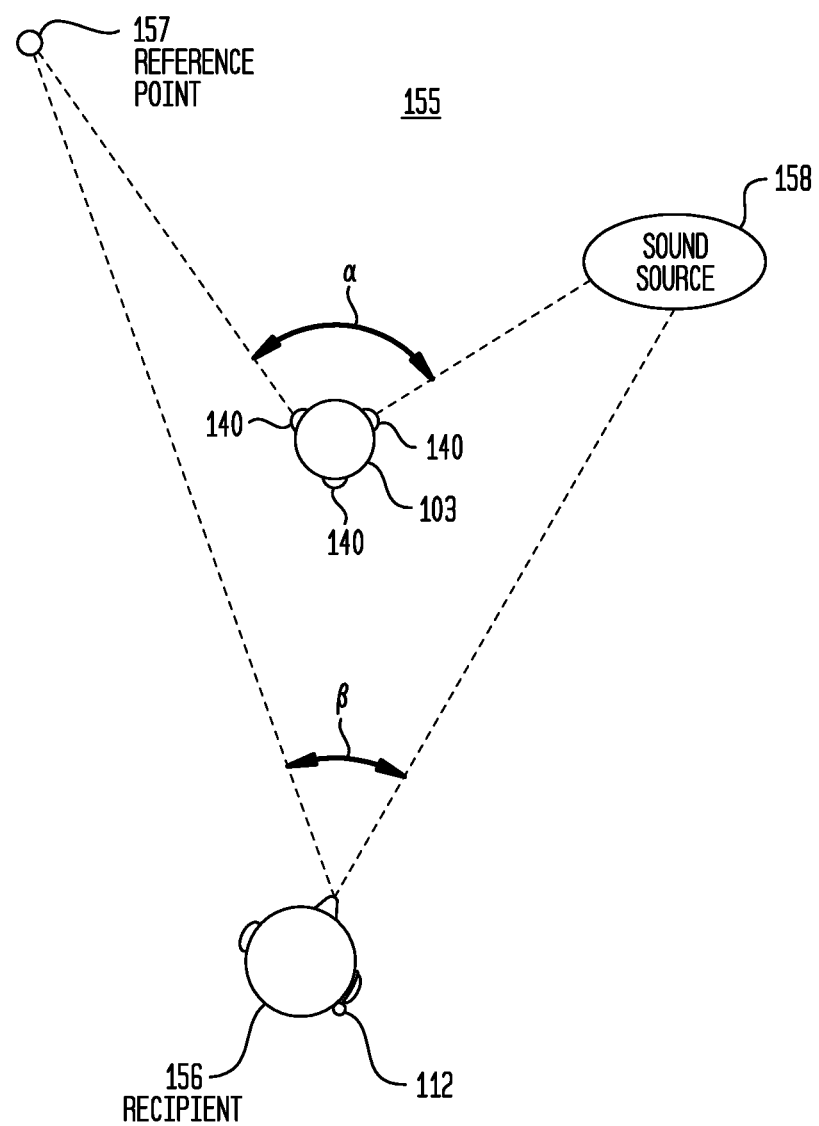
FIG. 3 is a schematic diagram illustrating use of a reference point with a spatial area, in accordance with certain embodiments presented herein.

FIG. 3 is a schematic diagram illustrating the concept of a stationary reference point 157 in a spatial area 155. As shown, the remote microphone device 103 and sound processing unit 112, worn by a recipient 156 of the cochlear implant 100, are co-located in the spatial area 155.

As would be understood, the angle between the sound processing unit 112 and a sound source 158 in the spatial area 155 will be different than the angle between the remote microphone device 103 and the sound source 158. Additionally, it would be understood that these relative angles are based on the locations and orientations of each of the sound processing unit 112 and the remote microphone device 103 at a given point in time. If the relative location and/or orientation of either device changes, then angles between the sound source 158 and each of the sound processing unit 112 and the remote microphone device 103 also change. The stationary reference point 157 and the relative locations and orientations of each of the remote microphone device 103 and the sound processing unit 112 thereto, can be used for orientation and/or location synchronization/calibration, where differential calculation is made based on motion of the two devices relative to the reference point.

In certain examples, the reference point 157 can be, for example, a feature in the spatial area 155 (e.g., a corner, a piece of furniture, etc.). In other embodiments, the reference point 157 can be the location of a reference device (e.g., a simple ultrasonic sender that emit ultrasonic pulses and is placed some distance from the remote microphone device 103). With the reference point 157, and dynamic synchronization checks during use, the recipient 156 and/or the sound source 158 could be allowed to move around the spatial area 155. Additionally, the use of the stationary reference point 157 makes the techniques robust against someone touching/moving the remote microphone device 103. However, it is to be appreciated that the use of a stationary reference point may not be required in all embodiments, such as embodiments in which neither the remote microphone device 103 nor the recipient move about the spatial area.

As noted above with reference to FIG. 2, after determining the relative positioning (e.g., location and orientation) of the remote microphone device 103 to the cochlear implant 100, at 153 a recipient-specified region of interest within the physical proximity is determined. The recipient-specified region of interest may be determined/identified in a number of different manners, some of which are described further below.

More specifically, in certain examples, the recipient-specified region of interest may be determined based on a primary gaze (i.e., look) direction of the recipient. The primary gaze direction of the recipient may be determined in a number of different manners. For example, in one embodiment, one or more inertial measurements representing motion, including absence of motion, of the head of the recipient can be captured using the one or more sensors 135. The inertial measurements (head motion data) can then be analyzed to determine the direction in which the recipient is primarily looking, which in turn is inferred to be the region/direction of interest to the recipient (i.e., the portion of the spatial area from which sounds should be captured/emphasized).

Use of inertial measurements is one illustrative technique for determining a primary gaze direction of the recipient. In other embodiments, the primary gaze direction of the recipient may be determined based on image data captured from external devices, such as cameras located in mobile computing devices (e.g., mobile phones). In certain such examples, the image data, when analyzed using image analysis techniques, can be used to determine head and eye directions of the recipient. In certain examples, cameras could alternatively be body-worn or placed around the room (e.g., a table, etc.) to capture image data that be analyzed through image analysis techniques.

In certain examples, the image data may include faces and the image analysis techniques may automatically track individuals within the spatial region. That is, face recognition techniques can be used to detect the recipient and/or individuals who can be potential speakers (or actually are speaking). Moreover, in certain embodiments, if no persons (potential sound sources) are detected at certain directions (certain spatial regions) from the remote microphone device 103, then the remote microphone device 103 can be instructed to ignore/remove sound should come from those direction and remove sound received therefrom (e.g., if no persons are in those regions, then the sounds may be considered noise). The image data can, in certain embodiments, be used to determine who is speaking and thus enable the remote microphone device 103 to capture sound from that person even when the listener is looking in another direction.

In one specific example, an application may be executed (e.g., a mobile computing device) where, at start-up of the remote microphone device 103, the recipient presses an activation button while at the same looking in to the camera of the mobile computing device. The captured image data can be used to identify the recipient (i.e., the listener) for differentiation from other individuals who may be sources of sound to be captured by the remote microphone device 103.

Determining the recipient-specified region of interest based on a primary gaze direction of the recipient is illustrative and other techniques for determining the recipient-specified region of interest may be used in other embodiments. In one such embodiment, the recipient-specified region of interest may be determined based on one or more inputs received via a user interface of the one or more devices, where the user inputs indicate/identify at least one of a person or a region on which the microphones 140 of the remote microphone device 103 should be focused.

Figure 4:
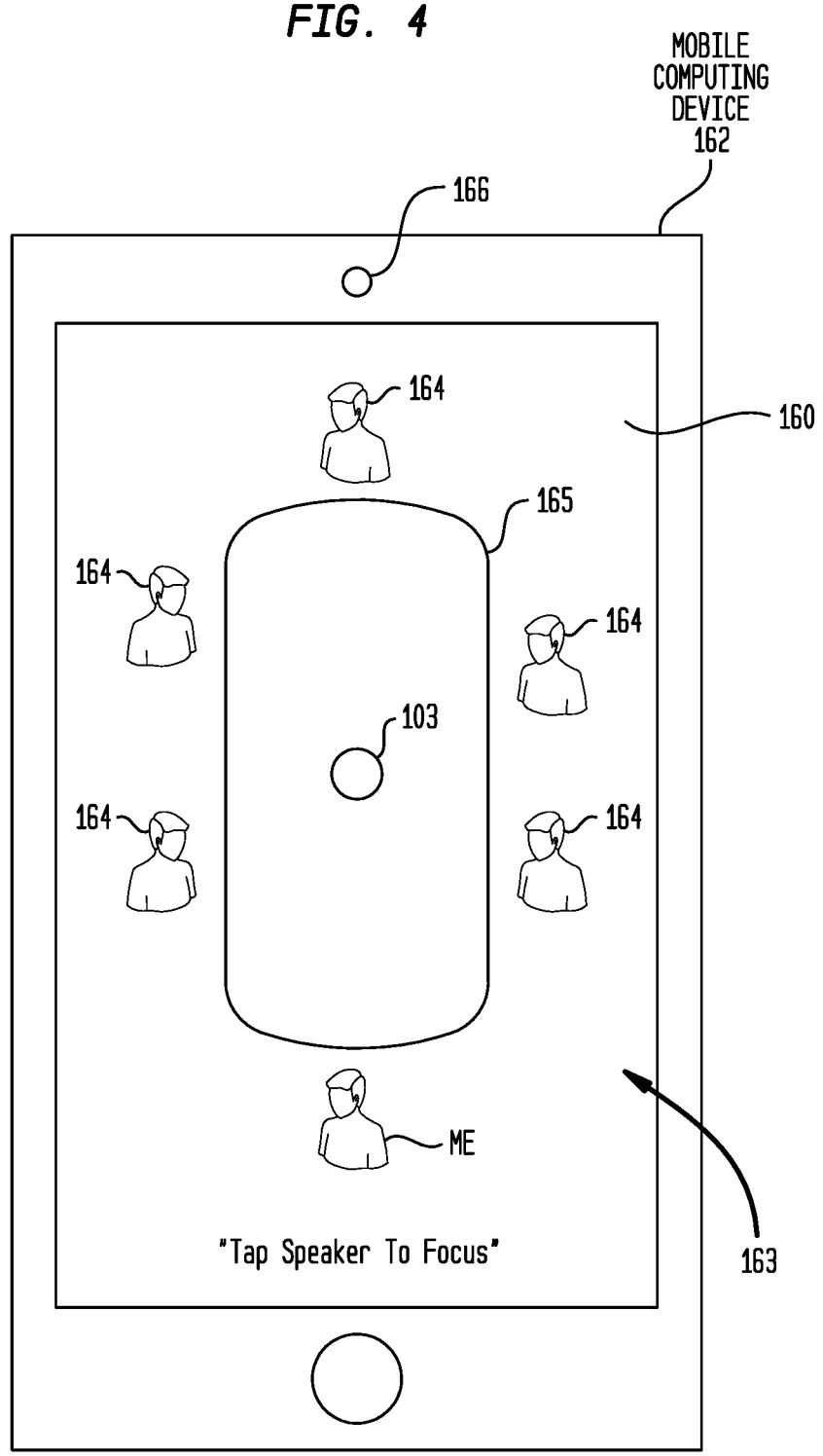
FIG. 4 is a schematic diagram illustrating a simplified user interface for use in certain embodiments presented herein.

For example, FIG. 4 is a schematic diagram illustrating a touchscreen 160 (i.e., user interface integrated with a display screen) of a mobile computing device 162 that may be used with the remote microphone device 103 and cochlear implant 100, describe above. Although FIG. 4 illustrates the use of a touch screen 162, other embodiments may use different user interfaces (e.g., keyboard, touchwheel, etc.) that are separate from a display screen.

Returning to the example of FIG. 4, the mobile computing device 162 displays on the touchscreen 162 a visual representation 163 of the spatial area. This visual representation 163 identifies potential sound sources within the spatial area and, in certain examples, may also include a visual representation of the relative locations of the sound sources, the remote microphone device 103, and the recipient. In FIG. 4, the potential sound sources are different individuals 164 seated around a table 165, wherein the remote microphone device 103 is positioned on the top surface of the table 165.

In certain examples, the mobile computing device 162 performs an initial scene analysis of the spatial area, from the perspective recipient, to generate the visual representation 163. This analysis may be based on, for example, sound data captured by the microphones 140 of the remote microphone device 104, sound data captured by sound input devices 108 of the sound processing unit 112, and/or other types of data captured by other input devices, such as image data captured by camera 166 of the mobile computing device 162. Once the scene analysis is performed the visual representation 163 is generated and displayed at the touchscreen 162.

In certain examples, the visual representation 163 is an augmented reality view of the spatial area. More specifically, using input devices of the mobile computing device 162, such as the camera 166, orientation sensors, etc., the mobile computing device 162 generates and displays an enhanced live direct or indirect view of the real-world environment of the spatial region.

In the example of FIG. 4, the visual representation 163 of the spatial region is augmented with a superimposed computer-generated message 168. In this illustrative example, the message 168 comprise instructions stating "Tap Speaker to Focus," which indicates to the recipient that the recipient should use the touchscreen 160 to identify the sound source (i.e., individual 164) on which he/she would like the remote microphone device 103 to focus. Although not shown in FIG. 4, once the recipient selects an individual 164, that specific individual may be highlighted or otherwise identified within the visual representation 163.

It is to be appreciated that the example of FIG. 4 illustrates a simplified user interface that enables a recipient to identify a person on which the recipient would like the remote microphone device 103 to focus. It is to be appreciated the specific user interface of FIG. 4 is illustrative and that other user interfaces may be generated to enable a recipient to identify at least one of a person or a region within the spatial area as the recipient-specified region of interest. For example, in other embodiments, the user interface could include a representation of the remote microphone device 103 in the center, with different "listening zones" identified around the representation of the remote microphone device. In such an example, the recipient could tap on one of the "listening zones" to direct the remote microphone's beam to that zone.

In other embodiments, the recipient-specified region of interest may be determined through microphone signal analysis, such as own voice detection. For example, the direction in which the person speaks could be used to infer the recipient-specified region of interest (e.g., the recipient speaks towards region "A," therefore the recipient wants to focus on sounds coming from region "A").

It is to be appreciated that the different techniques for determining the recipient-specified region of interest described above are not mutually exclusive and that these different techniques may be used together in different combinations. For example, in one such arrangement, the recipient-specified region of interest could initially be determined based on inputs received via a user interface. The recipient-specified region of interest could then be dynamically updated based on the subsequent primary gaze direction of the recipient.

In addition, certain embodiments presented herein may use signal processing to provide an initiation synchronization between the sound processing unit 112 and the remote microphone device 103. For example, the remote microphone device 103 may capture "snapshots" (e.g., captured audio signals captured within a discrete time window) of the auditory scene in a number of directions around the entirety of the device. These snapshots obtained at the remote microphone device 103 may be compared to the auditory scene from the perspective of the recipient (e.g., as determined by the sound processing unit 112 also using snapshots of the auditory scene in a number of directions). Once the best match is found, the devices are synchronized. Synchronization may be maintained through repeated use of snapshots.

As noted above with reference to FIG. 2, after determining the recipient-specified region of interest, the relative location and orientation of the remote microphone device 103 and the cochlear implant 100 is used to determine a direction of focus of the microphones of the remote microphone device and, eventually, the plurality of microphones 140 of the remote microphone device 103 are focused in that direction (i.e., on the recipient-specified region of interest/ listening direction). More specifically, using the relative location and orientation of the remote microphone device 103 and the cochlear implant 100, the cochlear implant and/or the mobile computing determines a desired direction (or a location of an audio source), relative to the remote microphone device 103, to which the plurality of microphones 140 should be focused (e.g., have increased sensitivity to). The data indicating the recipient-specified direction, or recipient-specified area of interest, is sometimes referred to herein as "recipient-specified directional data," which is sent from the cochlear implant and/or the mobile computing to the remote microphone device 103. Using the recipient-specified directional data, the remote microphone device 103 adapts its operations (e.g., at adaptive processor 142) so that the sensitivity of the microphones 140 (i.e., the microphone array 141) is towards the recipient-specified region of interest.

In accordance with certain embodiments presented herein, the determination of the recipient-specified region of interest/listening direction, as opposed to any default, may rely upon some attack/release times suited to typical listening habits, the speed of head movements, or other factors. For example, in some embodiments, the direction of focus of the remote device 103 should not change if the recipient quickly glances at a clock or other direction for only a brief period of time and/or if recipient quickly glances in a direction without a sound source. In other words, quick head movements and/or brief re-directions of focus need not trigger a direction/focus update on the remote microphone device 103. Similarly, the attack/release times may be selected so that the techniques are robust against the recipient leaning back/forth/to the sides, where such movement can change the distance and angle between the sound processing unit 112 and the remote microphone device 103, as well as the distance and angle between the sound processing unit 112 and the sound source.

Additionally, the cochlear implant 100 (or mobile device) and/or remote microphone device 103 can determine whether a direction of focus includes a legitimate sound source (e.g., speech, good SNR, etc.), noise, or no sounds before focusing the microphones 140 in that direction. If it is determined that there is only noise or no sounds in the recipient-specified region of interest, the cochlear implant 100 not update the remote microphone device 103 (i.e., will not send the recipient-specified directional data) or the remote microphone device 103 will note execute a direction/ focus update (i.e., will not act on the recipient-specified directional data). Similarly, the cochlear implant 100 and/or the remote microphone device 103 can scan the room initially and/or periodically to identify where troubling noise sources are located and filter those out expressly even as the recipient's direction of focus changes.

In certain embodiments, the determination of the recipient-specified region of interest could also be applied in a negative/subtractive manner, meaning that this information could be used to cancel certain speakers or sound sources in the space. Thus, sound from any direction in which the recipient's focus does not linger could be treated as noise.

The adaptive microphone focusing at the remote microphone device 103 may be implemented in a number of different manners. For example, in some instances, recipients may benefit from a remote microphone device with microphones in an omnidirectional mode. So, in certain embodiments presented herein, the remote microphone device has different modes of operation that are selectable automatically based on the recipient-specified data, or which may be autonomously selected/configured based on an assessment of the listening situation by, for example, the sound processing unit 112, a mobile computing device, etc.

In certain examples, information from an environmental classifier on the cochlear implant 100 and/or the remote microphone device 103 can be used as a factor in the adaptions at the remote microphone device 103 (e.g., the adaptive processor 142). For example, different listening environments (e.g., speech in noise, noise, quiet, speech, etc.) can benefit from different adaptions. For example, difficult listening environments (e.g., speech in noise, noise, etc.) might not require more aggressive adaptions (e.g., noise reductions) than easy listening environments (e.g., quiet, speech, etc.). In such difficult environments, the recipient might prefer to hear all speakers around a table with the microphones 140 on the remote microphone device 103 in omnidirectional mode, but also be able to dynamically switch in and out of the focusing at certain times. In addition, poor SNR in the direction of focus (i.e., towards the recipient-specified region of interest) could lead to enabling additional processing operations and/or disabling the recipient-specified focusing of the microphones.

In certain embodiments, the remote microphone device 103 can operate in omnidirectional mode and continue to analyze the recipient's direction of focus and make adjustments as needed. Further, very frequent head movements or frequent and significant head movements could benefit from omnidirectional mode. Thus, accelerometers in the cochlear implant 100 could drive enablement/disablement of the adaptive features.

FIG. 5 is flowchart of one example method 170 in accordance with certain embodiments presented herein. Method 170 begins at 172 where an auditory prosthesis is paired with a remote microphone device that comprises a plurality of microphones forming a microphone array. That is, the auditory prosthesis and the remote microphone device are registered with one another so that the two devices can wirelessly communicate with one another when they are within a relative physical proximity to one another.

At 173, the remote microphone device is placed at some location within a spatial area that is remote to (i.e., some distance from) the recipient and, at 174, the relative positioning (e.g., location and orientation) of the auditory prosthesis and the remote microphone device is determined. At 175, the remote microphone device is activated and begins to capture sounds. Initially, the remote microphone device may capture sounds using some default (e.g., omnidirectional) settings.

At 176, a determination is made as to whether or not the remote microphone device should focus its microphone array on a recipient-specified direction. This determination may be based, for example, in part on whether or not recipient-specified direction data has been provided by the auditory prosthesis or another device (e.g., mobile computing device paired with the auditory prosthesis). As noted above, this determination may also be based on other environmental or sound information, information from other sensors, etc.

If it is determined that the remote microphone device should not focus the microphone array on a recipient-specified direction/area, then at 177 the remote microphone device continues to capture sounds using the default settings. At 178, a determination can be made as to whether or not it is time to re-evaluate the relative positioning (e.g., location and orientation) of the auditory prosthesis and the remote microphone device. If it is time to re-evaluate the relative positioning of the auditory prosthesis and the remote microphone device, then method 170 returns to 174. Otherwise, method 170 returns to 176. It is to be appreciated that the operations at 178 may be performed, for example, periodically and in certain examples method 170 proceeds from 177 directly back to 176.

Returning to 176, if it is determined that the remote microphone device should focus the microphone array on a recipient-specified direction/area, then at 179 the operations of the remote microphone device are adapted so that the microphone array focuses in (i.e., has increased sensitivity to) the recipient-specified direction/area. At 180, the remote microphone device captures sounds while focusing on the recipient-specified direction/area. Method 170 may then again proceed to 178 for a determination as to whether or not it is time to re-evaluate the relative positioning of the auditory prosthesis and the remote microphone device. As noted, method 170 may then return to 174 or 176, depending on the results of the determination. If it is time to re-evaluate the relative positioning of the auditory prosthesis and the remote microphone device, then method 170 returns to 174. It is to be appreciated that the operations at 178 may be performed, for example, periodically and in certain examples method 170 proceeds from 180 directly back to 176.

FIG. 5, as well as other embodiments presented herein, have primarily been described with reference to focusing of the microphone array of a remote microphone device on a recipient-specified direction/area. However, in certain embodiments, the best microphone(s) available could actually be the ones on the auditory prosthesis, rather than those on the remote microphone device (e.g., in case the discussion partner is positioned right next to the recipient). As such, an auditory prosthesis system in accordance with certain embodiments presented herein may focus the microphones (microphone array) present on the auditory prosthesis on the recipient-specified direction/area. This focusing may be instead of, or in addition to, the focusing of the microphone array of the remote microphone device.

For example, in one such embodiment, an auditory prosthesis system comprises an auditory prosthesis configured to be worn by a recipient, a remote microphone device and, in certain cases, a mobile computing device, all located in the same spatial area. The auditory prosthesis includes a first microphone array, while the remote microphone device includes a second microphone array. In these examples, one or more processors are configured to synchronize location and orientation information of the remote microphone device with location and orientation information of the auditory prosthesis. The one or more processors are also configured to determine, based on the synchronized location and orientation information, a recipient-specified region of interest within the spatial area and to focus one or both of the first microphone array or the second microphone array on the recipient-specified region of interest within the spatial area. The one or more processors may be provided on/in the auditory prosthesis, the remote microphone device, the mobile computing device, or any combination thereof.

As described above, certain embodiments presented herein may make use of image data captured from external devices, such as cameras located in mobile computing devices to determine a recipient-specified direction or area of interest (e.g., as indicated by a primary gaze direction of a recipient). However, in certain embodiments presented herein, a remote microphone device may include a camera that is configured to capture image data. In such embodiments, the remote microphone device may also include one or more processors configured to analyze image data to determine the recipient-specified direction/area of interest (e.g., as indicated by a primary gaze direction of a recipient). In such embodiments, since the remote microphone device itself is configured to determine the recipient-specified direction/area of interest, no or limited interaction with a sound processing unit (beyond sending captured sound data to thereto) is needed (e.g., no need for gyroscope, accelerometer, focusing engine, etc. in the associated sound processing unit). Further details of such an embodiment are described below with reference to FIGS. 6A and 6B.

Figure 6A:
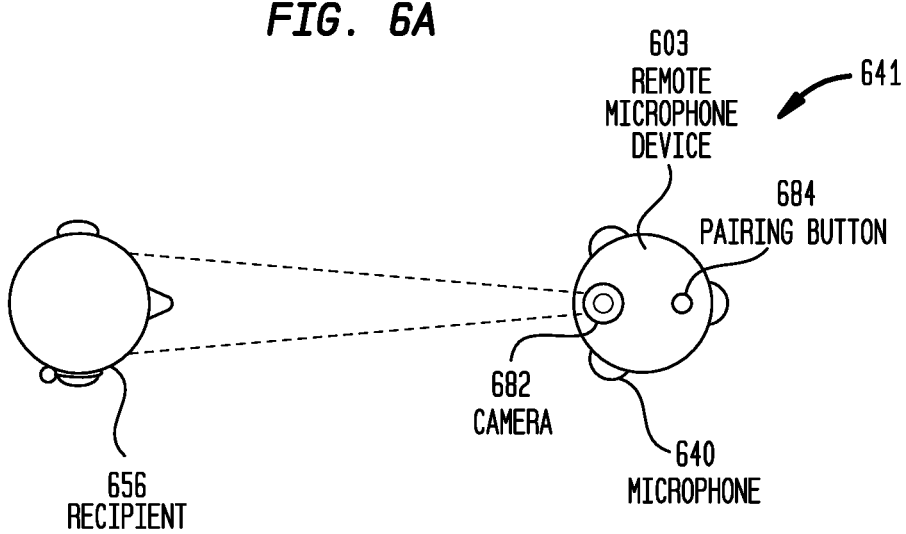
FIG. 6A is a schematic diagram illustrating a remote microphone device, in accordance with certain embodiments presented herein.

More specifically referring first to FIG. 6A, shown is a remote microphone device 603 positioned proximate to a recipient 656. The remote microphone device 603 comprises a microphone array 641 formed by three microphones 640, a camera 682, and a pairing button 684, among other elements. In this example, the camera 682 is a 360° fisheye camera and the remote microphone device 603 is configured to perform face recognition and to implement a person tracking system that maintains a record and awareness of all persons in a spatial area. In addition, the remote microphone device 603 is configured to dynamically add or remove persons from the tracking system.

Before using the remote microphone device 603, is paired with a sound processing unit for audio streaming of captured sound data thereto. This process is sometimes referred to herein as "device pairing." In addition, the remote microphone device 603 is also "face-paired" with a recipient or recipients. As used herein, "face-pairing" refers to a process in which the remote microphone device 603 learns/identifies the recipient with which the remote microphone device 603 is associated (i.e., which individual/person for which the remote microphone device 603 should determine a recipient-specified direction/area of interest). In practice, the device pairing may be performed in advance or at the same time as the face pairing may each may be performed using the pairing button 684 via, for example, different button press sequences. In an alternative embodiment, different pairing buttons may be provided for each of the device pairing and the face-pairing processes.

Figure 6B:
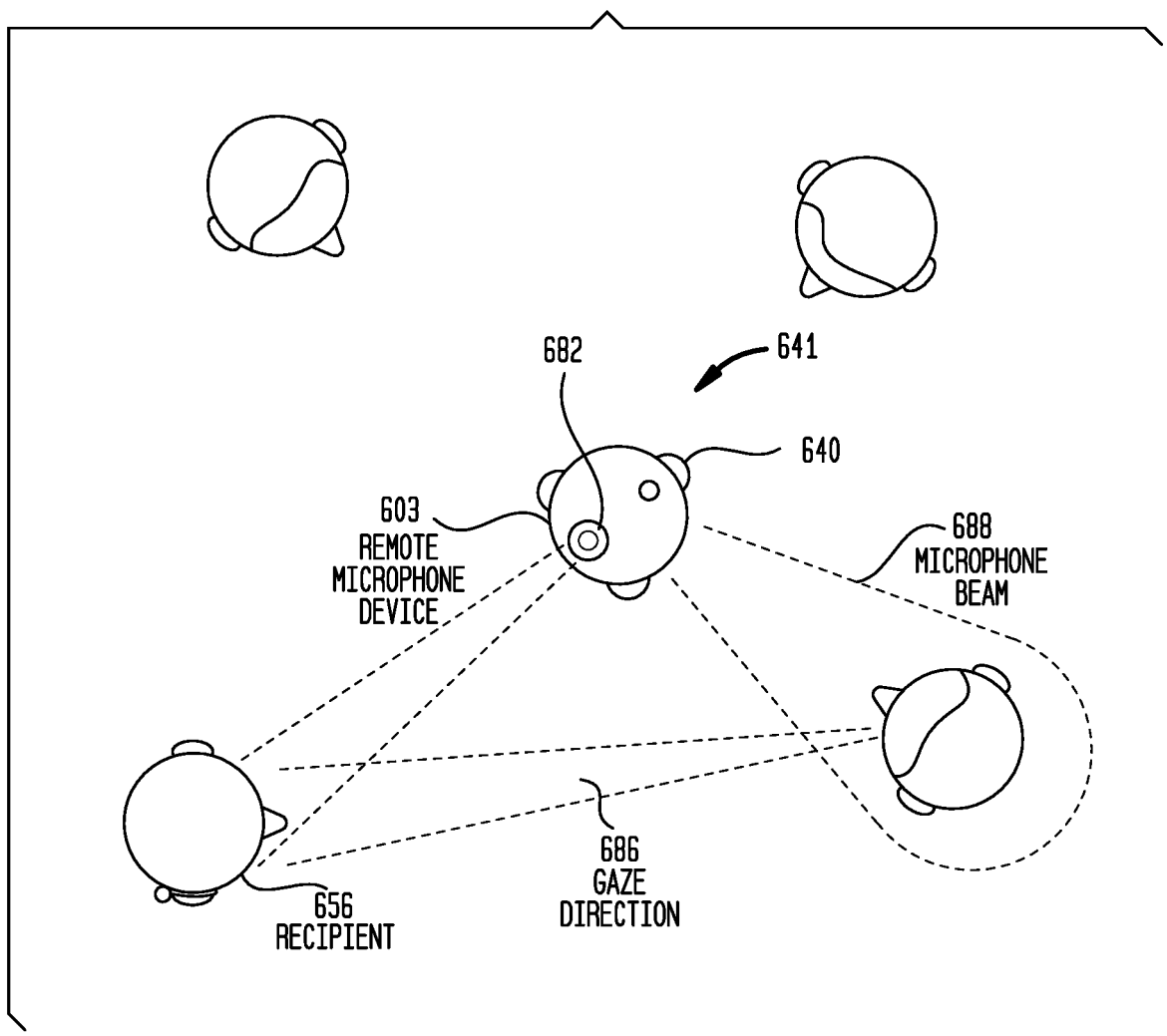
FIG. 6B is a schematic diagram illustration operation of the remote microphone device of FIG. 6A, in accordance with certain embodiments presented herein.

FIG. 6B illustrates operation of the remote microphone device 603 to capture sound signals. More specifically, during operation, the remote microphone device 603 analyzes image data captured by the camera 682 and follows the recipient's face, and potentially the faces of other persons in the spatial area. The remote microphone device 603 calculate the distance to the recipient and the angle where he/she is looking (i.e., the gaze direction). The recipient's gaze direction, shown as 686, is then used to control the beam forming for the microphone. In FIG. 6B, the resulting directionality (focus) of the microphone array 641 is a microphone beam 688.

In certain examples, the remote microphone device 603 may be face-paired with multiple recipients simultaneously. In such examples with multiple recipients, the result is multiple simultaneous microphone beams and multiple simultaneous audio streams to different sound processing units. In certain examples, the data from camera 682 also be used to identify sound sources that should be cancelled/ignored (e.g., sound coming from directions with no faces, directions of traffic noise from a window or similar, etc.). The data from camera 682 may also be used to recognize faces provided, for example, on a video/display screen.

It is to be appreciated that the embodiments presented herein are not mutually exclusive.

The invention described and claimed herein is not to be limited in scope by the specific preferred embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method, comprising:
    determining a relative location and a relative orientation of a remote microphone device to an auditory prosthesis, wherein the auditory prosthesis and the remote microphone device are each located within a same spatial area and wherein the remote microphone device comprises a plurality of microphones;
    determining a recipient-specified region of interest within the spatial area; and
    using the relative location and the relative orientation of the remote microphone device to the auditory prosthesis to focus the plurality of microphones of the remote microphone device on the recipient-specified region of interest within the spatial area.

2. The method of claim 1, wherein determining a recipient-specified region of interest within the spatial area comprises:
    determining a primary gaze direction of a recipient of the auditory prosthesis; and
    correlating the primary gaze direction of the recipient with the spatial area to determine the recipient-specified region of interest.

3. The method of claim 2, further comprising:
    capturing one or more inertial measurements representing motion of the head of the recipient of the auditory prosthesis; and
    determining the primary gaze direction of the recipient based on the one or more inertial measurements.

4. The method of claim 2, further comprising:
    capturing, via one or more image capture devices, image data from the spatial area; and
    performing image analysis techniques to determine the primary gaze direction of the recipient based on the image data.

5. The method of claim 1, wherein determining a recipient-specified region of interest within the spatial area comprises:
    receiving, via a user interface, one or more inputs identifying at least one of a person or a region of the spatial area.

6. The method of claim 1, further comprising:
    determining the relative location of the remote microphone device to the auditory prosthesis in relation to a stationary reference point in the spatial area.

7. The method of claim 1, further comprising:
    capturing, using the plurality of microphones of the remote microphone device, sound signals from the recipient-specified region of interest; and
    wirelessly sending the sound signals to the auditory prosthesis.

8. The method of claim 1, wherein the relative location of the remote microphone device to an auditory prosthesis and the recipient-specified region of interest within the spatial area are determined at the auditory prosthesis, and wherein the method further comprises:
    sending recipient-specified directional data indicating the recipient-specified area of interest from the auditory prosthesis to the remote microphone device; and
    using the recipient-specified directional data at the remote microphone device to focus the plurality of microphones of the remote microphone device on the recipient-specified region of interest.

9. The method of claim 1, wherein the relative location of the remote microphone device to an auditory prosthesis and the recipient-specified region of interest within the spatial area are determined at a mobile computing device in wireless communication with the auditory prosthesis and the remote microphone device, and wherein the method further comprises:
sending recipient-specified directional data indicating the recipient-specified area of interest from the mobile computing device to the remote microphone device; and
using the recipient-specified directional data at the remote microphone device to focus the plurality of microphones of the remote microphone device on the recipient-specified region of interest.

10. A method, comprising:
synchronizing location and orientation information of a remote microphone device with location and orientation information of an auditory prosthesis worn by a recipient, wherein the auditory prosthesis and the remote microphone device are each located within a same spatial area;
determining, based on the synchronized location and orientation information, a physical separation between the remote microphone device and the auditory prosthesis and orientation angles of each of the remote microphone device and the auditory prosthesis;
determining a substantially real-time recipient-specified listening direction for the remote microphone device; and
wirelessly sending directional data to the remote microphone device indicting the substantially real-time recipient-specified listening direction, the physical separation between the remote microphone device and the auditory prosthesis, and the orientation angles of each of the remote microphone device and the auditory prosthesis.

11. The method of claim 10, further comprising:
based on the directional data, configuring a microphone array of the remote microphone device for increased sensitivity to sounds originating from the recipient-specified listening direction.

12. The method of claim 10, wherein determining a recipient-specified listening direction comprises:
determining a primary gaze direction of the recipient; and
correlating the primary gaze direction of the recipient with the location and orientation information of a remote microphone device.

13. The method of claim 12, further comprising:
capturing one or more inertial measurements representing motion of the head of the recipient of the auditory prosthesis; and
determining the primary gaze direction of the recipient based on the one or more inertial measurements.

14. The method of claim 12, further comprising:
capturing, via one or more image capture devices, image data from the spatial area; and
performing image analysis techniques to determine the primary gaze direction of the recipient based on the image data.

15. The method of claim 10, wherein determining a recipient-specified listening direction comprises:
receiving, via a user interface, one or more inputs identifying at least one of a person or a region of the spatial area.

16. The method of claim 10, further comprising:
synchronizing the location and orientation information of the remote microphone device with the location and orientation information of the auditory prosthesis in relation to a stationary reference point in the spatial area.

17. The method of claim 11, further comprising:
capturing, using the increased sensitivity of the microphone array, sounds originating from the recipient-specified listening direction; and
wirelessly sending the sound signals to the auditory prosthesis.

18. The method of claim 10, further comprising:
determining the physical separation between the remote microphone device and the auditory prosthesis and the orientation angles of each of the remote microphone device and the auditory prosthesis at the auditory prosthesis.

19. The method of claim 10, further comprising:
determining the physical separation between the remote microphone device and the auditory prosthesis and the orientation angles of each of the remote microphone device and the auditory prosthesis at a mobile computing device.

20. An auditory prosthesis system, comprising:
an auditory prosthesis;
a remote microphone device; and
one or more processors configured to determine a relative location difference between the remote microphone device and the auditory prosthesis, determine a relative angular orientation difference between the remote microphone device and the auditory prosthesis, and to determine a recipient-specified listening direction,
wherein the remote microphone device comprises:
a wireless transceiver configured for direct or indirect communication with an auditory prosthesis;
a microphone array configured to capture sound signals; and
at least one processor configured to process the captured sound signals for wireless transmission by the wireless transceiver to the wireless transceiver of the auditory prosthesis,
wherein the at least one processor is configured to use the relative location difference between the remote microphone device and the auditory prosthesis and the relative angular orientation difference between the remote microphone device and the auditory prosthesis to dynamically adjust a directionality of the microphone array to the recipient-specified listening direction for the remote microphone device.

21. The auditory prosthesis system of claim 20, wherein the relative location difference between the remote microphone device and the auditory prosthesis and the relative angular orientation difference between the remote microphone device and the auditory prosthesis is identified in directional data received at the remote microphone device from at least one of the auditory prosthesis or a mobile computing device, wherein the directional data further indicates the recipient-specified listening direction for the remote microphone device.

22. The auditory prosthesis system of claim 21, wherein to adjust the directionality of the microphone array based on directional data, the at least one processor is configured to perform beamforming on the sound signals captured by the microphone array to increase the sensitivity of the microphone array towards the at least one of the recipient-specified area of interest or the recipient-specified listening direction.

23. The auditory prosthesis system of claim 21, wherein the at least one processor is configured to use the directional data to cancel sound signals received at the microphone array from one or more directions.

24. The auditory prosthesis system of claim 20, wherein the at least one processor is configured to perform a classification of the audio environment of the remote microphone device, and wherein the at least one processor is configured to dynamically adjust a directionality of the microphone array further based on the classification of the audio environment.

25. The auditory prosthesis system of claim 20, wherein the at least one processor is configured to determine whether the one of a recipient-specified area of interest within a spatial area of the remote microphone device or a recipient-specified listening direction for the remote microphone device corresponds to a location of a valid sound source in the spatial area, and wherein the at least one processor is configured to dynamically adjust a directionality of the microphone array only when the one of the recipient-specified area of interest within a spatial area of the remote microphone device or the recipient-specified listening direction for the remote microphone device corresponds to a location of a valid sound source.

26. The auditory prosthesis system of claim 20, further comprising a camera, wherein the at least one processor is configured to determine the one of a recipient-specified area of interest within a spatial area of the remote microphone device or a recipient-specified listening direction for the remote microphone device based on image data captured via the camera.

27. The auditory prosthesis system of claim 26, wherein the at least one processor is configured to determine a gaze direction of a recipient of the auditory prosthesis.

28. The auditory prosthesis system of claim 21, wherein the auditory prosthesis is configured to wirelessly send the directional data to the remote microphone device.

29. The auditory prosthesis system of claim 21, wherein the one or more processors are part of a mobile computing device, wherein the mobile computing device is configured to wirelessly send the directional data to the remote microphone device.

* * * * *